US010327110B2

(12) United States Patent
Singh et al.

(10) Patent No.: US 10,327,110 B2
(45) Date of Patent: Jun. 18, 2019

(54) METHOD AND SYSTEM FOR GENERATING A SIGNAL STRENGTH MAP

(71) Applicant: Samsung Electronics Co., Ltd., Suwon-si, Gyeonggi-do (KR)

(72) Inventors: Arun Kumar Singh, Noida (IN); Pankaj Mishra, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 14/930,001

(22) Filed: Nov. 2, 2015

(65) Prior Publication Data

US 2016/0127209 A1 May 5, 2016

(30) Foreign Application Priority Data

Nov. 1, 2014 (IN) .............. 3150/DEL/2014

(51) Int. Cl.
*H04W 48/18* (2009.01)
*H04W 24/02* (2009.01)
*H04W 4/04* (2009.01)
*H04W 24/10* (2009.01)

(52) U.S. Cl.
CPC ............ *H04W 4/04* (2013.01); *H04W 24/02* (2013.01); *H04W 24/10* (2013.01); *H04W 48/18* (2013.01)

(58) Field of Classification Search
CPC ....... H04W 4/04; H04W 24/10; H04W 24/02; H04W 64/00; H04W 4/02; H04W 4/008; H04W 72/0406; H04W 8/005; H04W 48/18
See application file for complete search history.

(56) References Cited

U.S. PATENT DOCUMENTS

| | | | |
|---|---|---|---|
| 8,320,280 B2 | 11/2012 | Meyer et al. | |
| 8,396,470 B2 | 3/2013 | Wormald | |
| 2008/0268816 A1* | 10/2008 | Wormald | H04W 68/00 455/412.2 |
| 2008/0293404 A1* | 11/2008 | Scherzer | H04W 84/18 455/426.1 |
| 2012/0066366 A1 | 3/2012 | Blaisdell | |
| 2012/0225665 A1* | 9/2012 | Alexander | H04W 52/242 455/456.1 |
| 2013/0288704 A1 | 10/2013 | Wirola et al. | |
| 2015/0050947 A1* | 2/2015 | Wirola | G01S 5/0252 455/456.1 |

* cited by examiner

*Primary Examiner* — Magdi Elhag
(74) *Attorney, Agent, or Firm* — Jefferson IP Law, LLP

(57) ABSTRACT

A system and method are provided for generating a signal strength map by a master device. The method includes operations for receiving, from a set of fixed transmitting devices, registration information including location, a type of signal and a device identifier (ID), receiving, from at least one receiving device, a set of parameters including location of the receiving device, strength of a first signal as received by the receiving device at a first location, type of the first signal, strength of a second signal as received by the receiving device at the first location, and type of the second signal, receiving at least one of the first or the second signal from at least one of the fixed transmitting devices, storing the received set of parameters, and generating a signal strength map representing strength of the first and the second signals at the first location.

21 Claims, 28 Drawing Sheets

METHOD AND SYSTEM FOR GENERATING A SIGNAL STRENGTH MAP

CROSS-REFERENCE TO RELATED APPLICATION(S)

This application claims the benefit under 35 U.S.C. § 119(a) of an Indian patent application filed on Nov. 1, 2014 in the Indian Patent Office and assigned Serial number IN 3150/DEL/2014, the entire disclosure of which is hereby incorporated by reference.

TECHNICAL FIELD

The present disclosure relates to wireless network environments. More particularly, the present disclosure relates to generating a signal strength map in a wireless network environment.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology, have been developed.

Accordingly, a need exists for $5^{th}$ generation (5G) or pre-5G communication systems which support higher data transfer rates, beyond a $4^{th}$ generation (4G) network communication system such as long term evolution (LTE).

The above information is presented as background information only to assist with an understanding of the present disclosure. No determination has been made, and no assertion is made, as to whether any of the above might be applicable as prior art with regard to the present disclosure.

SUMMARY

Generally, there are various electronic devices used in a typical home network. Examples of such electronic devices include, but are not limited to televisions, laptops, cellular phones, routers, refrigerators, air conditioners, washing machines, microwave ovens, etc. With each passing day, such electronic devices are becoming smarter. These smart electronic devices already have or may be provided with the capability to connect to each other through various wireless/wired communication technologies. These smart electronic devices used in a home network or a smart home, can therefore collaborate with each other and share the relative spatio-temporal information of signals emitted or received by them with a master device to generate a signal strength map for the home network, which can lead to various usable applications.

Aspects of the present disclosure are to address at least the above-mentioned problems and/or disadvantages and to provide at least the advantages described below. Accordingly, an aspect of the present disclosure is to provide a method and a device for generating a signal strength map for a home network.

Another aspect of the present disclosure is to provide a method and a device for assisting generation of a signal strength map for a home network.

To this end, a set of fixed transmitting devices in a home network are registered at a master device based on a device identifier (ID) and a type of signal, such as wireless, Zigbee, Bluetooth (BT), GSM/code division multiple access (CDMA), broadband, near field communication (NFC), etc. Further, various parameters are received at the master device from a receiving device. In the present disclosure, the parameters include a current location of the receiving device, strength of a first signal as received by the receiving device at a first location, type of the first signal, strength of a second signal as received by the receiving device at the first location, and type of the second signal. Further, at least one of the first or the second signal is received from at least one of the fixed transmitting devices. The master device stores the parameters and generates the signal strength map representing strength of the first and the second signals at the first location. In one implementation, a variation in strength of the first and the second signal as received by the receiving device at different locations is determined. In another implementation, a variation in strength of at least one of the first or the second signal as received by the receiving device at the first location over a period of time is determined. In one implementation, a variation in strength of the first and the second signal as received by the receiving device at different locations over a period of time is determined.

The signal strength map can be utilized in various ways. For example, the signal strength map could be used for predicting the location of best signal quality for a particular time period in response to a user query, thus helping the user in doing tasks, such as video conference, phone conversations, or the like. In another example, the signal strength map could be used for locating a lost device in response to a user query. In another example, the signal strength map could be used for inter-device notification among "Internet of things" (IOT) in a home network. In another example, the signal strength map could be used for changing a device's behavior based on a user's location or contextual situation inside a home network. In another example, the signal strength map could be used for inter-device collaboration in a home network.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
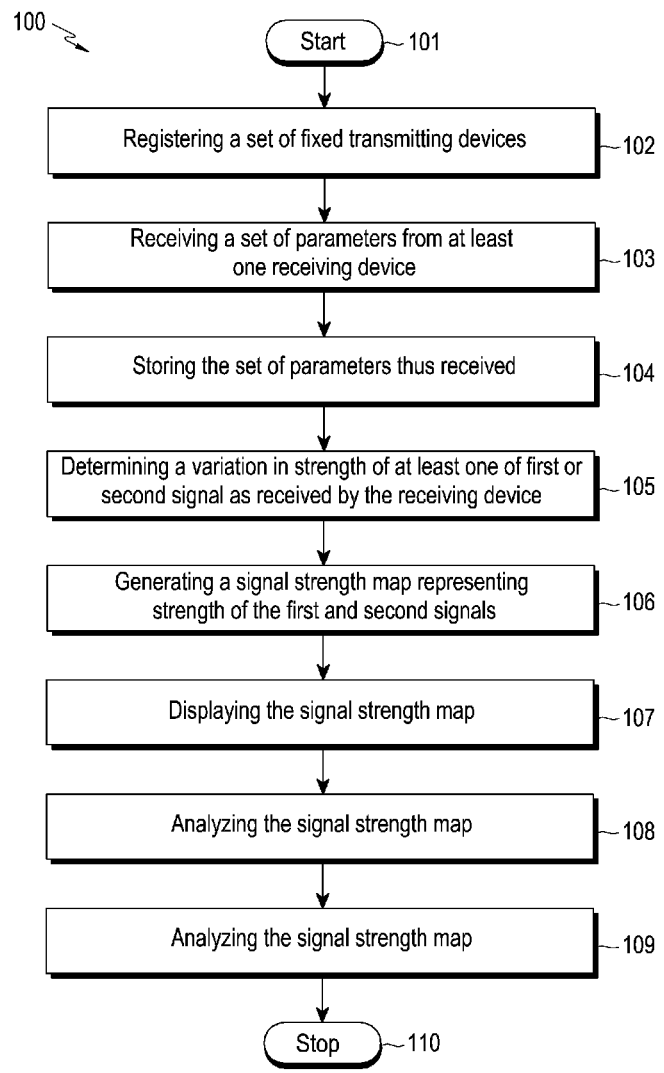
FIG. 1 is a flowchart of a method for generating a signal strength map, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the foregoing general description and the following detailed description are explanatory of the disclosure and are not intended to be restrictive thereof. Throughout the patent specification, a convention employed is that in the appended drawings, like numerals denote like components.

Reference throughout this specification to "an embodiment", "another embodiment" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures proceeded by "comprises . . . a" does not, without more constraints, preclude the existence of other devices or other sub-systems.

A device and method proposed in the present disclosure may be applied to various communication systems such as, a long-term evolution (LTE) mobile communication system, a LTE-advanced (LTE-A) mobile communication system, high speed downlink packet access (HSDPA), a high speed uplink packet access (HSUPA) mobile communication system, 3rd generation project partnership 2 (3GPP2), a high rate packet data (HRPD) mobile communication system, a wideband code division multiple access (WCDMA) 3GPP2 mobile communication system, a CDMA 3GPP2 mobile communication system, an Institute of Electrical and Electronics Engineers (IEEE) and 802.16m communication system, an evolved packet system (EPS), and a mobile internet protocol (Mobil, IP) systems, etc.

FIG. 1 illustrates a method for generating a signal strength map, according to an embodiment of the disclosure. The method 100 is performed by a master device but embodiments are not limited thereto.

Referring to FIG. 1, in a preferred embodiment of the present disclosure, the method 100 starts at operation 101 and thereafter a set of fixed transmitting devices is registered at the master device at operation 102. Here, registration information includes location, a type of signal and a device identifier (ID). A set of parameters is received at the master device from at least one receiving device at operation 103. Here, the set of parameters include location of the receiving device, strength of a first signal as received by the receiving device at a first location, type of the first signal, strength of a second signal as received by the receiving device at the first location, and type of the second signal, wherein at least one of the first or the second signal is received from at least one of the fixed transmitting device. Further, the set of parameters thus received is stored by the master device at operation 104. Further, a signal strength map representing strength of the first and the second signals at the first location is generated by the master device at operation 106.

In another embodiment of the present disclosure, the set of parameters further includes device ID of the fixed transmitting device from which the signal is received.

In another embodiment of the present disclosure, the registration information further includes time information about a time of receipt of the signal from the fixed transmitting device.

In another embodiment of the present disclosure, the set of parameters further includes strength of a further signal as received by the receiving device at the first location and type of the further signal.

In another embodiment of the present disclosure, a variation in strength of at least one of the first or the second signal as received by the receiving device at the first location over a period of time is determined, at operation 105.

In an alternative embodiment to the previous embodiment of the present disclosure, the variation in strength of the first and the second signal as received by the receiving device at different locations is determined, at operation 105.

In another embodiment of the present disclosure, the set of fixed transmitting devices includes a plurality of fixed transmitting devices.

In another embodiment of the present disclosure, the receiving device includes one or more moving devices (MDs) and/or one or more fixed transmitting devices.

In another embodiment of the present disclosure, the signal strength map is displayed at operation 107.

In another embodiment of the present disclosure, the signal strength map is analyzed at operation 108.

In another embodiment of the present disclosure, an action may be performed based on the analysis of the signal strength map, at operation 109. Here, the action includes at least one of the following actions for recommending a signal type for use at a particular location, recommending a location for accessing a particular type of signal, determining location of one or more receiving devices, or controlling an electronic device based on a location of one or more receiving devices. The electronic device whose operation can be controlled includes a transmitting device or a receiving device. The method for generating the signal strength map then ends at operation 110.

Figure 2:
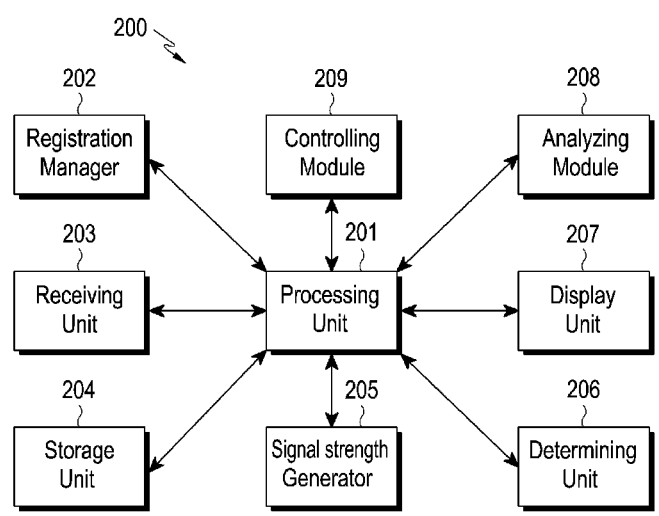
FIG. 2 illustrates a device for generating a signal strength map, according to an embodiment of the present disclosure.

FIG. 2 illustrates a master device for generating a signal strength map according to an embodiment of the present disclosure. The master device 200 includes one or more processing units 201 that are operatively coupled with other components of the master device 200.

Referring to FIG. 2, in a preferred embodiment of the present disclosure, the master device 200 includes a registration manager 202 for registering a set of fixed transmitting devices with the master device 200. The registration information includes location, a type of signal, and a device ID. The master device 200 also includes a receiving unit 203 for receiving a set of parameters from at least one receiving device. The set of parameters include location of the receiving device, strength of a first signal as received by the receiving device at a first location, type of the first signal, strength of a second signal as received by the receiving device at the first location, and type of the second signal, wherein at least one of the first or the second signal is received from a fixed transmitting device. The master device 200 also includes a storage unit 204 for storing the set of parameters thus received. The master device 200 also includes a signal strength generator 205 for generating a signal strength map representing strength of the first and the second signals at the first location.

In another embodiment of the present disclosure, the master device 200 may further include a determining unit 206 for determining a variation in strength of at least one of the first or the second signal as received by the receiving device at the first location over a period of time.

In another embodiment of the present disclosure, the determining unit 206 can be further adapted to determine a variation in strength of the first and the second signal as received by the receiving device at different locations.

In another embodiment of the present disclosure, the master device 200 also includes a display unit 207 for displaying the signal strength map.

In another embodiment of the present disclosure, the master device 200 may further include an analyzing module 208 for analyzing the signal strength map.

In another embodiment of the present disclosure, the analyzing module 208 may be coupled with an internal or external recommending module (not shown) for recommending a signal type for use at a particular location or for recommending a location for accessing a particular type of signal. Alternatively, the analyzing module 208 may be coupled with an internal or external a determining module (not shown) for determining location of one or more receiving devices.

In one embodiment of the present disclosure, the master device 200 may further include a controller or controlling module 209 for controlling an electronic device based on a location of one or more receiving devices.

Figure 3:
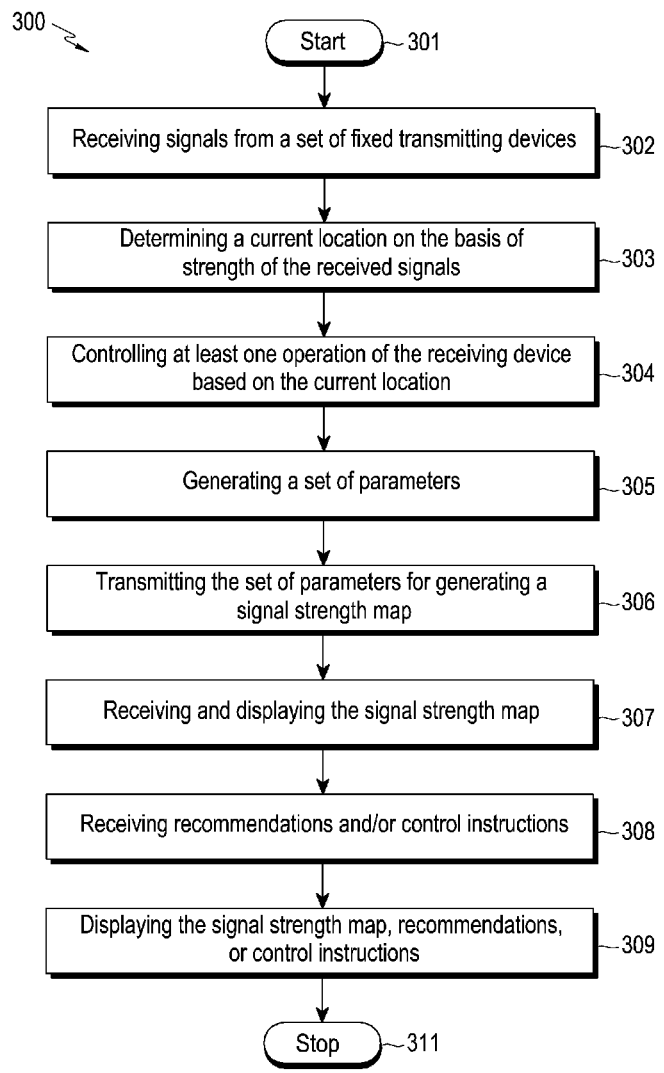
FIG. 3 is a flow chart of a method for assisting generation of a signal strength map, according to an embodiment of the present disclosure.

FIG. 3 illustrates a method for assisting generation of a signal strength map according to an embodiment of the present disclosure. The method 300 is performed by a receiving device in a home network but embodiments are not limited thereto.

Referring to FIG. 3, in a preferred embodiment of the present disclosure, the method 300 starts at operation 301 and thereafter signals are received by the receiving device from a set of fixed transmitting devices, at operation 302. Here, the received signals include information about the type of signal and a device ID of each of the fixed transmitting devices. Further, a set of parameters is generated by the receiving device, at operation 305. Here, the set of parameters includes a location of the receiving device, strength of a first signal as received by the receiving device at a first location, type of the first signal, strength of a second signal as received by the receiving device at the first location, and type of the second signal, wherein at least one of the first or the second signal is received from a fixed transmitting device. The set of parameters is transmitted by the receiving device for generating a signal strength map, at operation 306.

In another embodiment of the present disclosure, the set of parameters further includes device ID of the fixed transmitting device from which receiving device receives the signal.

In another embodiment of the present disclosure, the set of parameters further includes information about a time of receipt of the signal from the fixed transmitting device.

In another embodiment of the present disclosure, the set of parameters further includes strength of a further signal as received by the receiving device at the first location and type of the further signal.

In another embodiment of the present disclosure, a current location is determined by the receiving device on the basis of strength of the received signals, at operation 303.

In another embodiment of the present disclosure, at least one operation of the receiving device is controlled based on the location of the receiving device, at operation 304.

In another embodiment of the present disclosure, the signal strength map is received by the receiving device, at operation 307.

In another embodiment of the present disclosure, a recommendation and/or a control instruction is received by the receiving device, at operation 308.

In another embodiment of the present disclosure, one or more of the signal strength map, the recommendation, and the control instruction is displayed on the receiving device, at operation 309. The method for assisting generation of the signal strength map then ends at operation 311.

Figure 4:
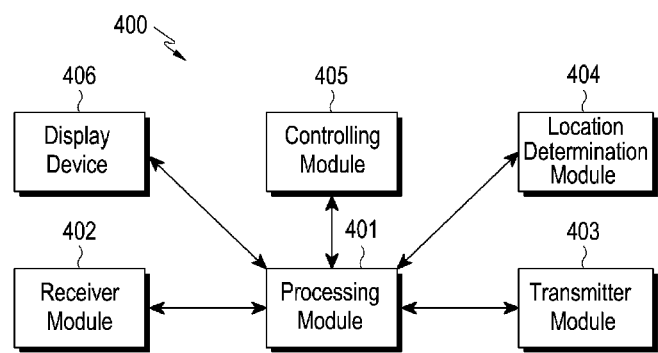
FIG. 4 illustrates a device for assisting generation of a signal strength map, according to an embodiment of the present disclosure.

FIG. 4 illustrates a receiving device for assisting generation of a signal strength map according to an embodiment of the present disclosure. The receiving device 400 includes one or more processing modules 401 that are operatively coupled with other components of the receiving device 400.

Referring to FIG. 4, in a preferred embodiment of the present disclosure, the receiving device 400 includes a receiver module 402 for receiving signals from a set of fixed transmitting devices. The received signals include information about a type of signal and a device ID. The processing module 401 generates a set of parameters including a location of the receiving device 400, strength of a first signal as received by the receiving device 400 at a first location, a type of the first signal, strength of a second signal as received by the receiving device 400 at the first location, and a type of the second signal, wherein at least one of the first or the second signal is received from a fixed transmitting device. The receiving device 400 also includes a transmitter module 403 for transmitting the set of parameters for generating the signal strength map.

In another embodiment of the present disclosure, the receiving device 400 further includes a location determination module 404 for determining a current location of the receiving device 400 on basis of strength of the received signals.

In another embodiment of the present disclosure, the receiving device 400 further includes a controlling module 405 for controlling at least one operation of the receiving device 400 based on the location of the receiving device 400.

In another embodiment of the present disclosure, the receiver module 402 is further adapted for receiving the signal strength map and the processing module 401 is further adapted to control a display device 406 for displaying the received signal strength (RSS) map.

In another embodiment of the present disclosure, the receiver module 402 is further adapted for receiving one or more recommendations and the processing module 401 is further adapted to control the display device 406 for the one or more recommendations.

Figure 5:
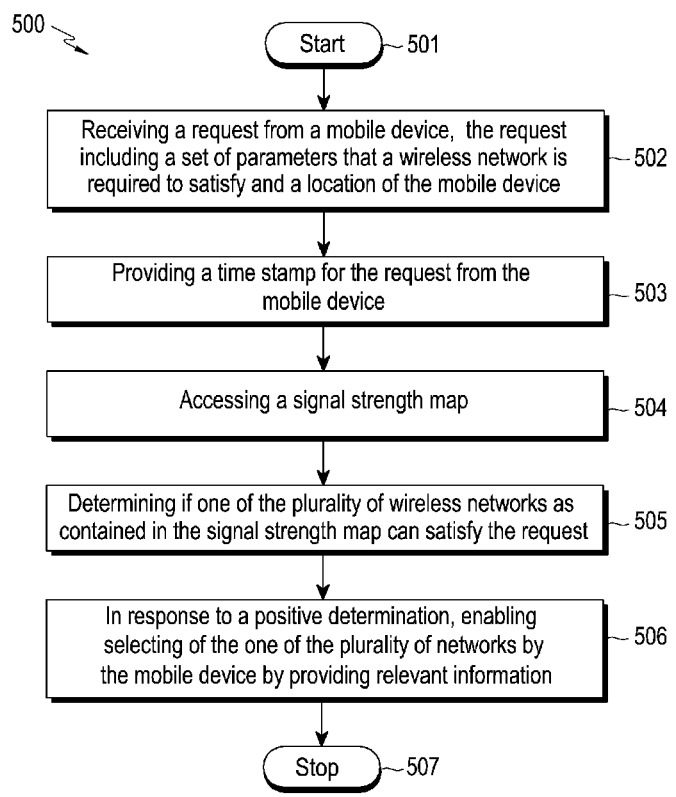
FIG. 5 is a flowchart of a method for selecting a wireless network from a plurality of wireless networks, according to an embodiment of the present disclosure.

FIG. 5 illustrates a method for selecting a wireless network from a plurality of wireless networks according to an embodiment of the present disclosure. The method 500 is performed by the master device 200 but embodiments are not limited thereto.

Referring to FIG. 5, in a preferred embodiment of the present disclosure, the method 500 starts at operation 501 and thereafter a request is received at the master device 200 from an MD, at operation 502. Here, the request includes a set of parameters that a wireless network is required to satisfy and a location of the MD. Further, a signal strength map is accessed by the master device 200, at operation 504. The signal strength map includes strength of a signal pertaining to a first wireless network at one or more locations, details of the first wireless network, strength of a signal pertaining to a second wireless network at one or more locations, and details of the second wireless network, wherein at least one of the first or the second wireless network is formed of the master device 200 and a set of fixed transmitting device. Further, it is determined by the master device 200 if one of the plurality of wireless networks as contained in the signal strength map can satisfy the request, at operation 505. In response to a positive determination at operation 505, selection of the one of the plurality of networks by the MD is enabled by the master device 200, at operation 506. The method for selecting a wireless network then ends at operation 507.

In another embodiment of the present disclosure, a time stamp for the request from the MD is provided, at operation 503.

In another embodiment of the present disclosure, the set of parameters that a wireless network is required to satisfy includes one or more of information about a nature of service, minimum signal strength, maximum travel distance, a preferred location, a preferred time period, and a preferred type of signal.

In another embodiment of the present disclosure, the operation 506 of enabling selection of the one of the plurality of networks by the MD 200 includes providing, by the master device 200, information pertaining to at least one location for selecting the one of the plurality of networks.

In another embodiment of the present disclosure, the operation 506 of enabling selection of the one of the plurality of networks by the MD includes providing, by the master device 200, details of the one of the plurality of networks.

In another embodiment of the present disclosure, the details of the one of the plurality of networks include one or more of a name of the network, and information about the fixed transmitting device forming part of the network.

Figure 6:
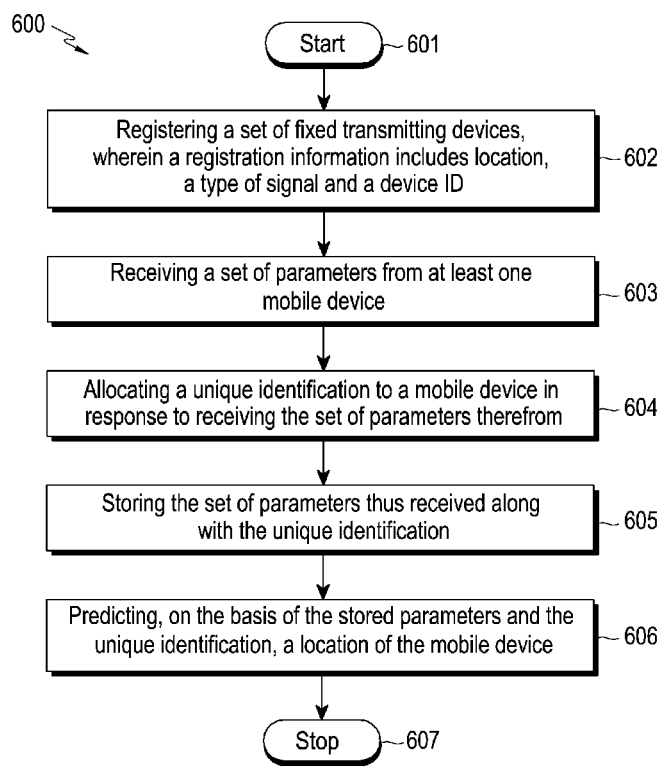
FIG. 6 is a flowchart of a method for predicting location of a moving device (MD), according to an embodiment of the present disclosure.

FIG. 6 illustrates a method for predicting location of an MD according to an embodiment of the present disclosure. The method 600 is performed by the master device 200 but embodiments are not limited thereto.

Referring to FIG. 6, in a preferred embodiment of the present disclosure, the method 600 starts at operation 601 and thereafter a set of fixed transmitting devices is registered at the master device 200, at operation 602. The registration information includes location, a type of signal, and a device ID. Further, a set of parameters is received at the master device 200 from at least one MD, at operation 603. The set of parameters include strength of a first signal as received by the MD, type of the first signal, strength of a second signal as received by the MD, and type of the second signal, wherein at least one of the first or the second signal is received from a fixed transmitting device. Further, a unique identification is allocated by the master device 200 to an MD in response to receiving the set of parameters therefrom, at operation 604. Further, the set of parameters thus received along with the unique identification is stored by the master device 200, at operation 605. Further, a location of the MD is predicted on the basis of the stored parameters and the unique identification, at operation 606. The method for predicting location of the MD then ends at operation 607.

In another embodiment of the present disclosure, the set of parameters further includes device ID of the fixed transmitting device from which the signal is received.

In another embodiment of the present disclosure, the set of parameters further includes information about a time of receipt of the signal from the fixed transmitting device.

In another embodiment of the present disclosure, the set of parameters further includes strength of a further signal as received by the MD and type of the further signal.

Figure 7:
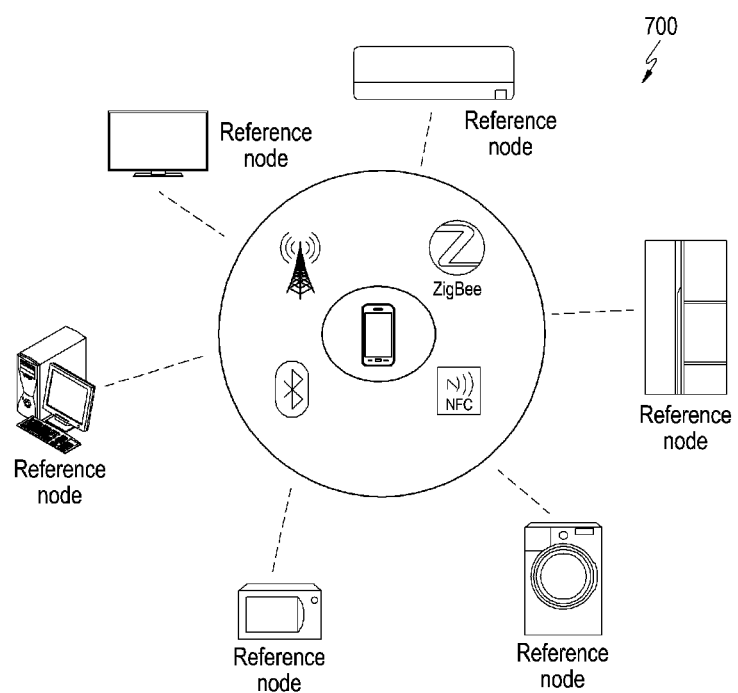
FIG. 7 illustrates convergence of home devices and home network protocols, according to an embodiment of the present disclosure.

FIG. 7 illustrates a home network 700 having convergence of home devices and convergence of home network protocols according to an embodiment of the present disclosure. Here, home devices include, but are not limited to television, refrigerator, microwave oven, washing machine, computing device, and air conditioner, etc. Further, the home network protocols include, but are not limited to wireless local area network (WLAN), Bluetooth (BT), Zig-Bee, near field communication (NFC), etc. Each of these home network protocols may be assigned a unique signal ID depending upon signal type as shown in Table 1 below:

The following Table 1 indicates a mapping relationship between unique signal IDs according to a signal type.

TABLE 1

| # | Signal Unique ID | Signal Type |
|---|---|---|
| 1 | S_1 | Wireless signal |
| 2 | S_2 | BT |
| 3 | S_3 | Zigbee |
| 4 | S_4 | GSM |

Each of the fixed home devices acts as a reference node for a handheld or MD. The handheld device or MD, such as a smart phone, tablet, or wirelessly connected laptop, generates a location fingerprint over a period of time. The location fingerprint comprises a signal profile in the form of received signal strength indicator (RSSI) information of various signals coming from fixed reference devices. Here, the signal profile contains information including, but not limited to signal strength at various places of home with service provider or signal type information, and context information of signal strength in respect of day, time, and relative location. Further, the signal profile is learned for each cell of a grid, where the entire home can be represented as the grid. Further, based on this signal profile, a master device generates a signal strength map of the home. This signal strength map keeps updating itself based on any new and different data. In one application, the master device can predict the best signal strength based on this signal strength map and also guide the user to the location having optimum signal strength based on the signal map. In another application, the signal strength map can also help the user in locating a lost device based on received signal pattern from the lost device.

In accordance with an embodiment of the disclosure, the home network works in three different modes, including an "Initialization Mode" which involves initialization of the home network using convergence of home network devices, i.e., fixed devices at home by grid formation for the signal map, a "Learning mode" which involves learning of the signal map using convergence of various home network devices, including fixed and moving, as well as convergence of various signal types emitted from all devices within the home network 700, and a "Standard Mode" for enabling "Intelligent Best Signal Prediction System" as well as "Intelligent device search System" which utilize the learned signal map for various purposes. Each of these modes is described below in detail.

Initialization Mode

Figure 8:
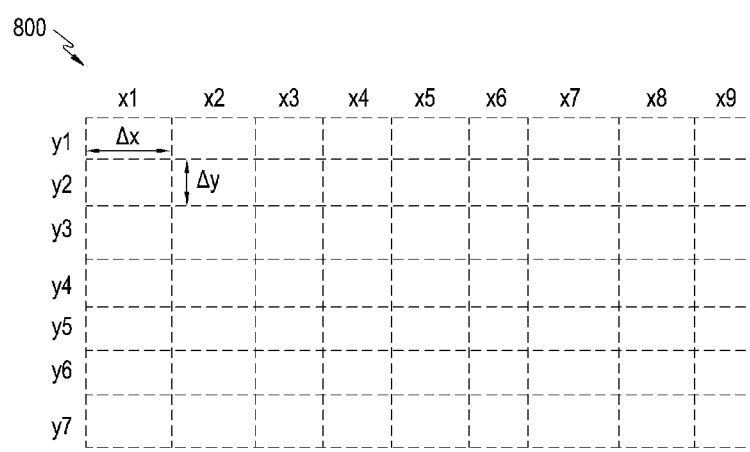
FIG. 8 illustrates grid formation in the home network area, according to an embodiment of the present disclosure.

In the initialization mode, a layout or map of the house can be an input for converting the home network area into a signal grid. A user can configure the dimensions of each cell of the grid. In a preferred embodiment of the present disclosure, the cell dimension is about 1 to 2 feet for each side of the cell. Based on dimensions of home network area and cell dimensions, a grid 800 as shown in the FIG. 8 can be automatically formed at, for example, a master device.

Figure 9:
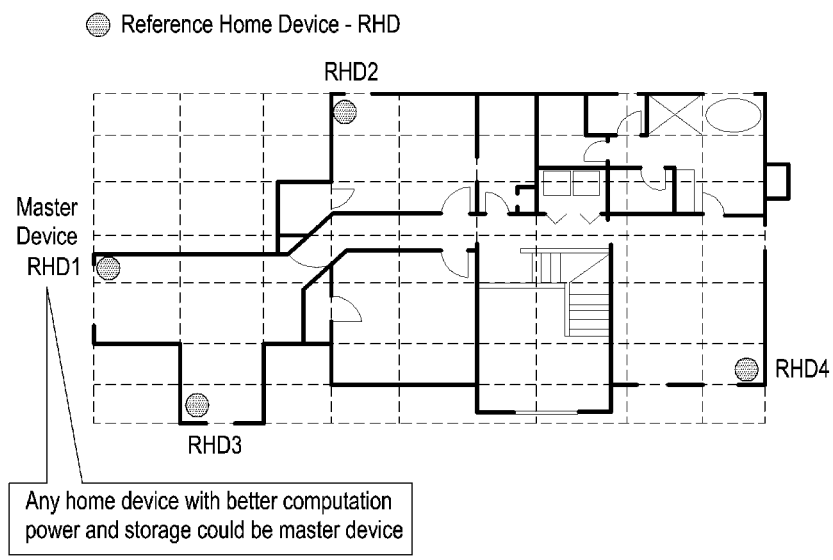
FIG. 9 illustrates initialization of a grid with a number of home network devices, according to an embodiment of the present disclosure.

After the grid formation, the user can initialize the grid with known devices, such as a television (TV), air conditioning (AC), refrigerator, etc., in the home network. FIG. 9 illustrates initialization of a grid with a number of home network devices (i.e., reference home device (RHD)) RHD 1, RHD 2, RHD 3, and RHD 4 according to an embodiment of the present disclosure. Referring to FIG. 9, in a preferred embodiment of the present disclosure, a minimum of 3 devices is recommended to initialize the grid but embodiments are not limited thereto. These devices can further initialize location of other fixed devices using triangulation methods without requiring any manual intervention. According to an embodiment of the present disclosure, one of the devices would need better computing power and storage for learning a signal map of the grid. Accordingly, any device, such as RHD 1, having better computing power and storage, can be designated as the master device for computation and storage purpose. The remainder of the fixed devices RHD 2, RHD 3, and RHD 4 at the home can become part of crowd sourcing over a period of time.

Figure 10:
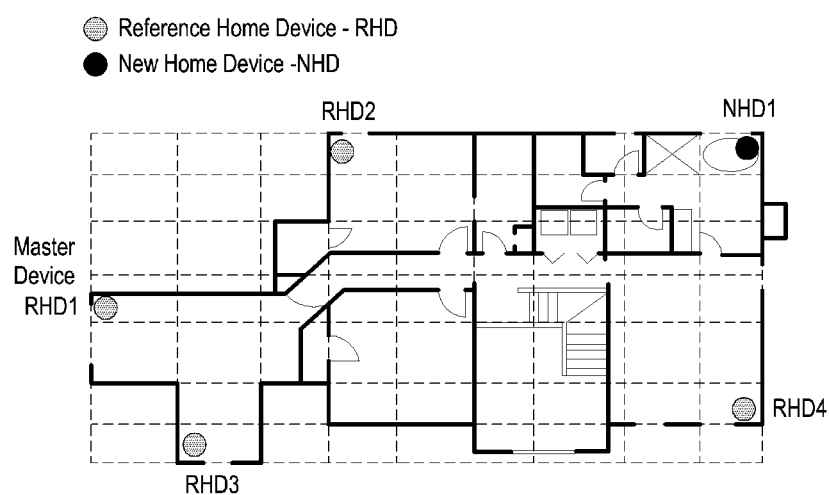
FIG. 10 illustrates introduction of new device in a home network area, according to an embodiment of the present disclosure.

FIG. 10 illustrates the introduction of a new home device, such as NHD 1, in the home network area according to an embodiment of the present disclosure. The new fixed device NHD 1 can send a location fingerprint (f(RSSI, $\alpha$, Time, Xi, Yi), where $\alpha$ is signal type) to the master device regularly.

Figure 11A:
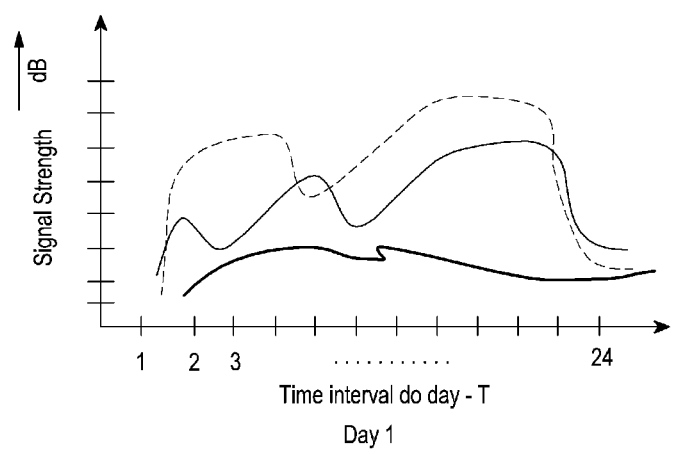
FIGS. 11A and 11B illustrate an approach of identifying device as a fixed reference device, according to an embodiment of the present disclosure.
Figure 11B:
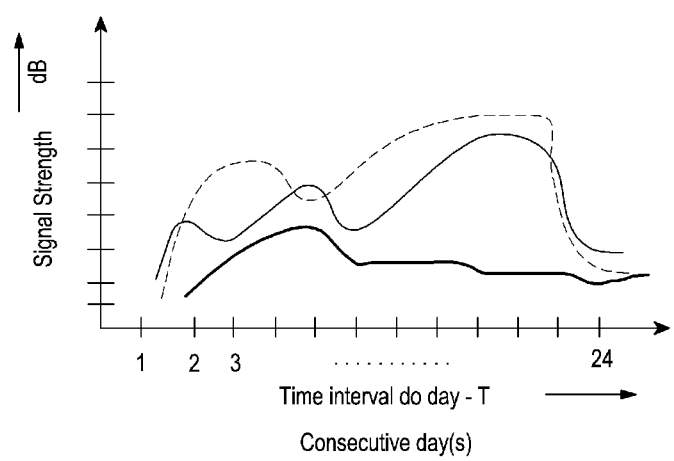
Figure 12:
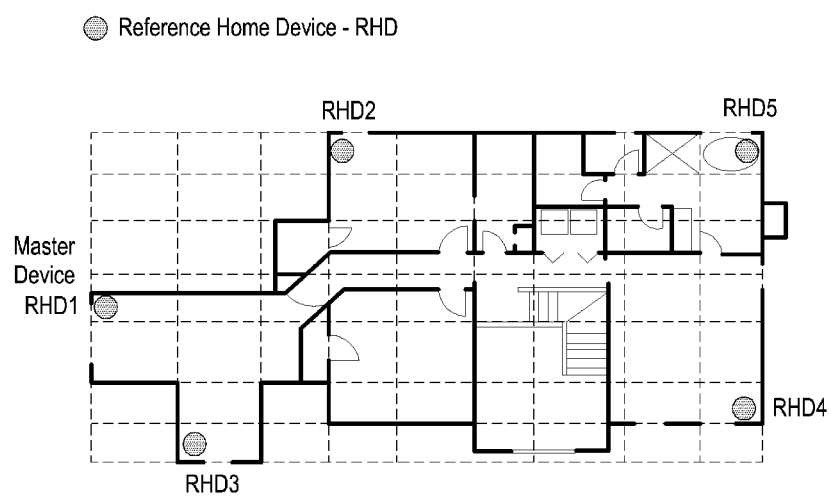
FIG. 12 illustrates registration of new device as a fixed reference device, according to an embodiment of the present disclosure.

FIG. 11A and FIG. 11B in association with Table 2 below illustrate an operation for identifying the new reference device NHD 1 as a fixed reference device. FIGS. 11A and 11B are plots of signal strength over time, where signal strength is shown on the vertical axis in units of decibels (dB), and time is shown on the horizontal axis in units of hours. If the master device RHD 1 does not observe changes in daily patterns based on signal strength graphs for one day and consecutive days, this new reference device NHD 1 would get registered as a reference home device and will take part in crowd sourcing. FIG. 12 illustrates registration of the new home device NHD 1 as fixed reference device RHD 5 according to an embodiment of the present disclosure.

TABLE 2

| Device ID | Device Info/ RSS signature | Device label | Device name | Description |
|---|---|---|---|---|
| RHD_1 | $X_1, Y_2, S\_1$, 0.9 dB | Master Device | Smart TV | Master device acting as primary for computation and storage |
| RHD_2 | $X_4, Y_6, S\_4$, 0.7 dB | Reference device | Air Conditioner | Other fixed devices, but not master device |
| RHD_2 | $X_4, Y_6, S\_3$, 0.8 dB | Reference device | Air Conditioner | Same device emitting different signal |
| RHD_5 | $X_9, Y_8, S\_4$, 0.6 dB | Reference device | Refrigerator | New fixed device - which became reference device over a period of time |
| SD_1 | X?, Y?, S_5, 0.8 dB | Standard device | Laptop | MDs - Not yet registered as fixed reference device (therefore, fixed grid coordinates not available) as it moves often inside house |

Referring to FIG. 12, in one scenario, the new fixed device NHD 1 may be out of range of master device. In this scenario, if the new fixed device NHD 1 does not receive information about the master device RHD 1, it can choose any other nearby reference device, such as RHD 2, for forwarding its location fingerprint. The chosen other reference device RHD 2 acts as a routing device and transfers the information to the master device RHD 1.

Learning Mode

Figure 13:
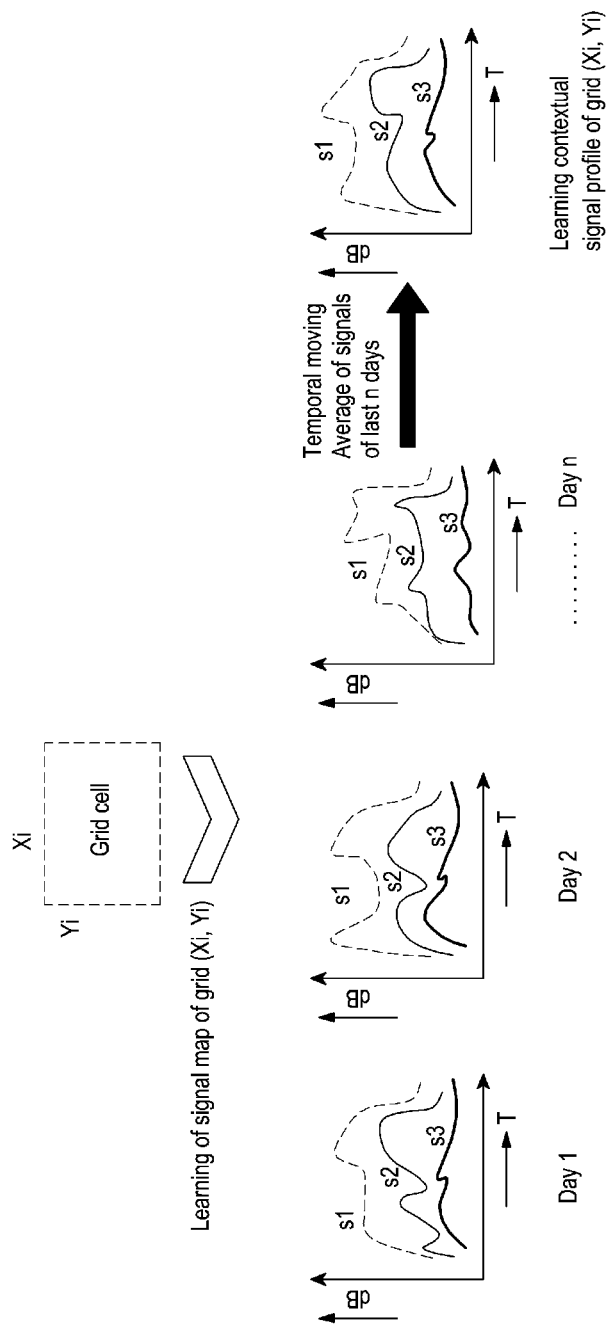
FIG. 13 illustrates an approach for learning of a signal map for each grid cell, according to an embodiment of the present disclosure.

In the learning mode, temporal signal maps are determined for the grid cells over a period of time. FIG. 13 illustrates an approach for learning a signal map for each grid cell according to an embodiment of the present disclosure. FIG. 13 includes plots of signal strength over time, for a series of days 1, 2, . . . n, where signal strength is shown on the vertical axis in units of decibels (dB), and time is shown on the horizontal axis in units of hours. Learning mode works gradually over a period of time. The master device learns the spatio-temporal signal map for various signals as and when MDs, such as laptop, cellular phone, tablet, etc., move within the home network area. Over a period of time, most of the grid cells are covered by MDs at various times of the day. Learning happens for each grid cell based on the location of MDs. In the learning mode, MDs collect the received signal information, particularly signal strength and signal type, from RHDs. Based on RSSI, the MDs estimate its relative grid location (Xi, Yi).

Referring to FIG. 13, based on the RSSI, each MD can estimate its distance from the signal source. The relationship between the RSSI and distance is indicated by Equation (1) as follows:

$$\text{RSSI [dBm]} = A - [10*n*\log 10(d/d0)] \quad (1)$$

Where n is the path loss exponent or the signal propagation constant, d is the distance from transmitter in meters, d0 is a reference distance, typically 1 meter, and A is the RSS at this 1 meter distance, in dBm. For relative grid estimation, maximum likelihood estimation technique can be used. For example, where the grid coordinates of reference devices are $(x_1, y_1), (x_2, y_2), \text{- - -}$ and $(x_n, y_n)$ and coordinates of an MD are determined as (x, y), the distance between the unknown node and reference nodes are $d_1, \text{- - -}, do$ respectively. A group of non-linear equation in a two-dimensional space can be obtained by Equation (2) as follows:

$$(x - x_1)^2 + (y - y_1)^2 = d_1^2 \quad (2)$$
$$(x - x_2)^2 + (y - y_2)^2 = d_2^2$$
$$\vdots$$
$$(x - x_n)^2 + (y - y_n)^2 = d_n^2$$

The above Equations (1) and (2) can be represented by Equation (3) as follows when the last equation is subtracted from other equations in turn beginning from the first equation:

$$x^2 - x_n^2 - 2(x_1 - x_n)x + y_1^2 \quad (3)$$
$$-y_n^2 - 2(y_1 - y_n)y = d_1^2 - d_n^2$$
$$\vdots$$
$$x_{n-1}^2 - x_n^2 - 2(x_{n-1} - x_n)x + y_{n-1}^2$$
$$-y_n^2 - 2(y_{n-1} - y_n)y = d_{n-1}^2 - d_n^2$$

The above linear equations can be represented by Equation (4) as follows:

$$Xb = a$$

Where, $$X = \begin{bmatrix} 2(x_1 - x_n) & 2(y_1 - y_n) \\ \vdots & \vdots \\ 2(x_{n-1} - x_n) & 2(y_{n-1} - y_n) \end{bmatrix}, \quad (4)$$

$$a = \begin{bmatrix} x_1^2 - x_n^2 + y_1^2 - y_n^2 - d_1^2 + d_n^2 \\ \vdots \\ x_{n-1}^2 - x_n^2 + y_{n-1}^2 - y_n^2 - d_{n1}^2 + d_n^2 \end{bmatrix},$$

$$b = \begin{bmatrix} x \\ y \end{bmatrix}, \hat{b} = (X^T X)^{-1} X^T a.$$

Each MD generates and sends a location fingerprint to the master device for learning purposes, as shown in Table 3 below. A location fingerprint can be represented by Equation (5) as follows:

Location finger print=$f$(RSSI,$\alpha$,Time,$Xi$,$Yi$), where $\alpha$ is signal type or $F(X,Y,T) = f(\alpha, \text{RSSI})$     (5)

The following Table 3 indicates fingerprint information shared with master device.

TABLE 3

| Fingerprint location | Finger print information |
|---|---|
| F(X$_1$, Y$_1$, T1) | {S_1, 0.9 dB; S_3, 0.8 dB; S_4, 0.5 dB} |
| F(X$_3$, Y$_5$, T3) | {S_2, 0.8 dB; S_4, 0.5 dB; S_5, 0.7 dB} |
| — | — |

Figure 14:
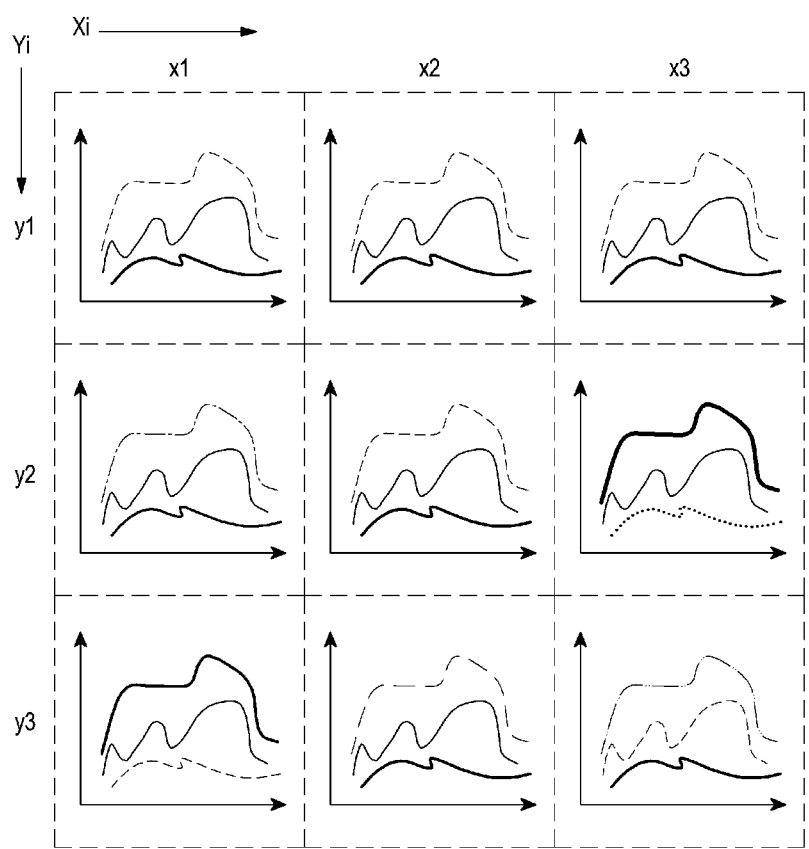
FIG. 14 illustrates a learned signal map for each grid cell, according to an embodiment of the present disclosure.

The master device collects the location fingerprint for a particular grid cell at a particular time. The master device then estimates temporal moving averages of previous n days of signal data for each signal and for each grid cell. Finally over a period of time, most of the grid cell will have its temporal signal map. FIG. 14 illustrates such a learned signal map for each grid cell which is identifiable from X and Y coordinates (Xi, Yi)) according to an embodiment of the present disclosure. FIG. 14 includes a collection of signal maps for each grid cell, where signal strength is shown on the vertical axis in units of decibels (dB) and time is shown on the horizontal axis in units of hours, and the grid cells are identified by a vertical axis Yi, and a horizontal axis Xi.

Standard Mode

Once learning mode is over, the home network is switched to a standard mode. In the standard mode, MDs need not estimate relative location. The MDs only need to send received signal signatures at regular intervals or based on demands from the master device.

The signal signature can be represented by Equation (6) as follows:

Signal signature=$f(\alpha,\text{RSSI})$, where $\alpha$ is signal type     (6)

Figure 15:
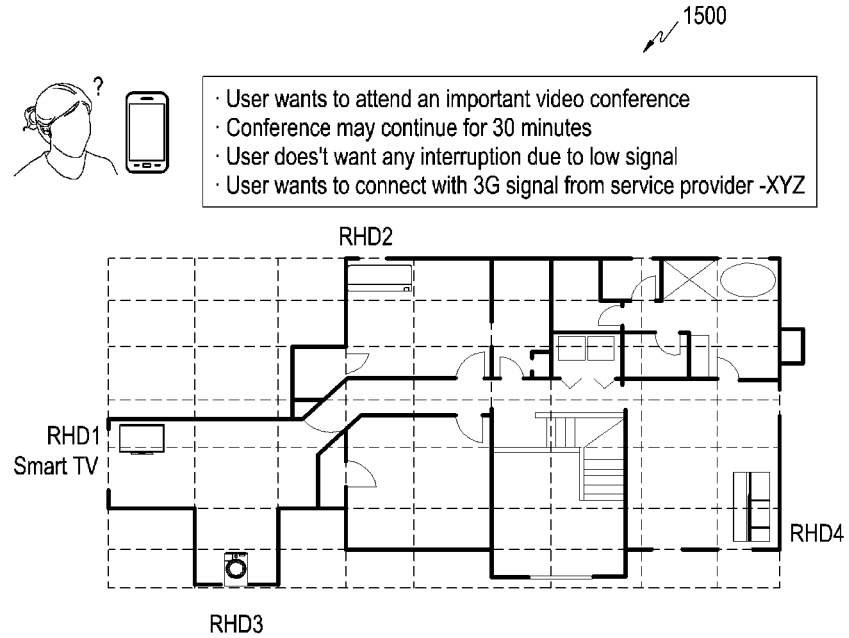
FIG. 15 illustrates a user scenario for a need of a best signal prediction at any given time, according to an embodiment of the disclosure.

FIG. 15 illustrates a best location prediction scenario 1500 where a user needs a best signal prediction at any given time in his/her house according to an embodiment of the present disclosure. Accordingly, the master device is requested to provide the user a list of nearby locations sorted in order of current signal strength. When the user wants to make an important call, the user can choose a desired location from amongst the list of nearby locations to enjoy an un-interrupted call. In one example as shown, the user wants to attend an important video conference, which may continue about 30 minutes. Further, the user wants to connect the video conference using a 3G signal from a service provider XYZ. Further, the user does not want any interruption in the video conference at least due to low signal strength. As shown, there are various smart devices RHD 1, RHD 2, RHD 3 and RHD 4 in various locations in the house.

Figure 16:
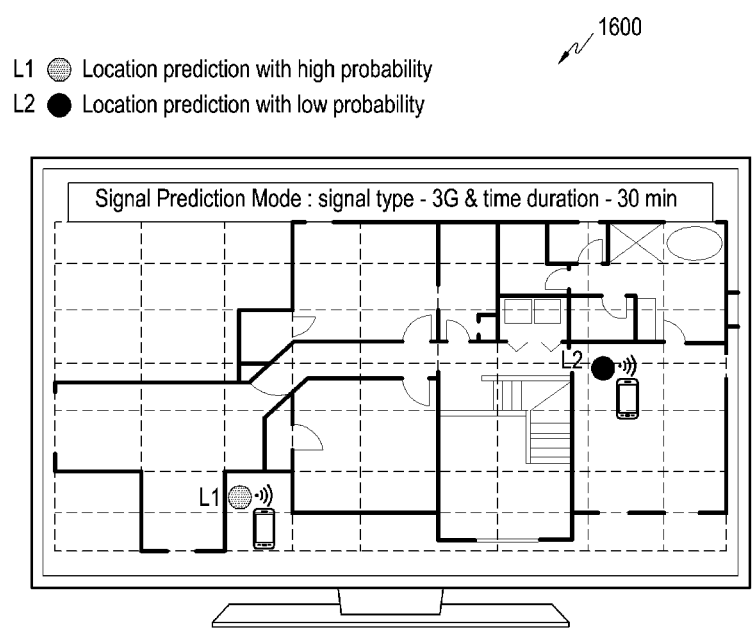
FIG. 16 illustrates a sample app user interface (UI) for a best signal prediction at any given time, according to an embodiment of the disclosure.

FIG. 16 illustrates a sample app user interface (UI) for a best signal prediction at any given time, according to an embodiment of the disclosure.

FIG. 16 illustrates a sample application UI 1600 for a best signal prediction at any given time. In one example, a master device may generate this application UI 1600. The application UI graphically displays locations having high and low probabilities L1 and L2, respectively, for attending the video conference without any interruption. As shown, location L1 is the location having high probability for attending the video conference without any interruption, whereas the location L2 is the location having low probability for attending the video conference without any interruption. Accordingly, the user may prefer the location L1 for attending the video conference.

Figure 17:
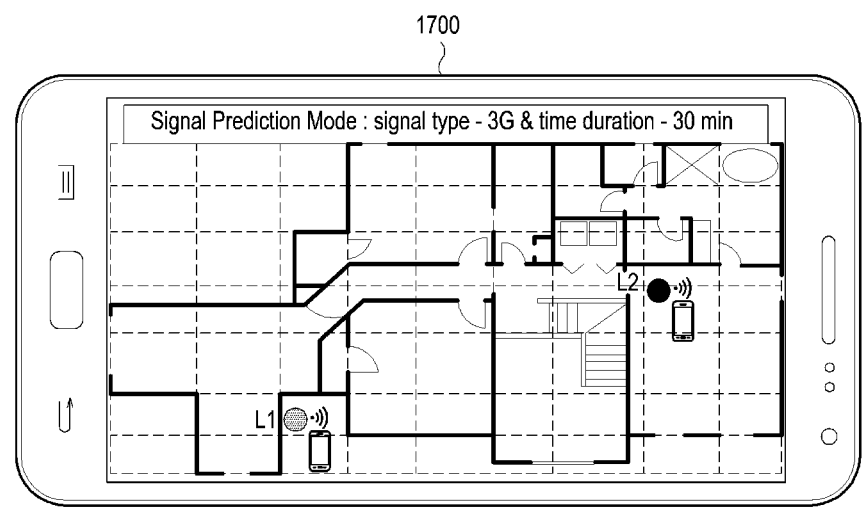
FIG. 17 illustrates a transfer of UI for a best signal prediction to other display devices, according to an embodiment of the present disclosure.

FIG. 17 illustrates a transfer of UI for a best signal prediction to other display devices, according to an embodiment of the present disclosure.

FIG. 17 illustrates a transfer of the application UI 1600 for best signal prediction to another hand held smart device 1700 having a display device. In continuation to the previous example, the user may request the application UI 1600 on his/her hand held smart device 1700, such as a smart phone or computer tablet. Based on the request from the smart device 1700, the master device may transfer the application UI 1600 to the hand held smart device 1700. In one implementation, the hand held smart device 1700 itself may be implemented as the master device.

Figure 18:
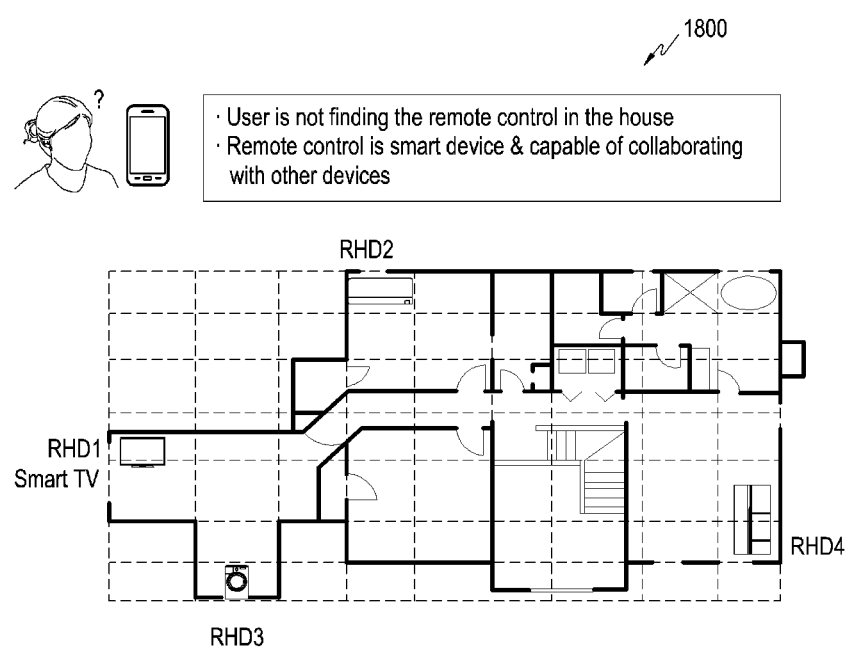
FIG. 18 illustrates a user scenario for a search of lost device at home, according to an embodiment of the present disclosure.

FIG. 18 illustrates a best signal prediction scenario 1800 where a user wants to search for a lost device at a house according to an embodiment of the present disclosure. Here, the master device is requested to identify a location of a cell having the best signal at the requested time for a given interval from learned temporal signal maps. In one example as shown, a remote control is a smart device and is capable of collaborating with various other smart devices at the house. A request is made through the remote control to the master device to locate the lost device. In order to locate the lost device, the master device may employ signal signature matching techniques to find a current location of the lost device.

Figure 19:
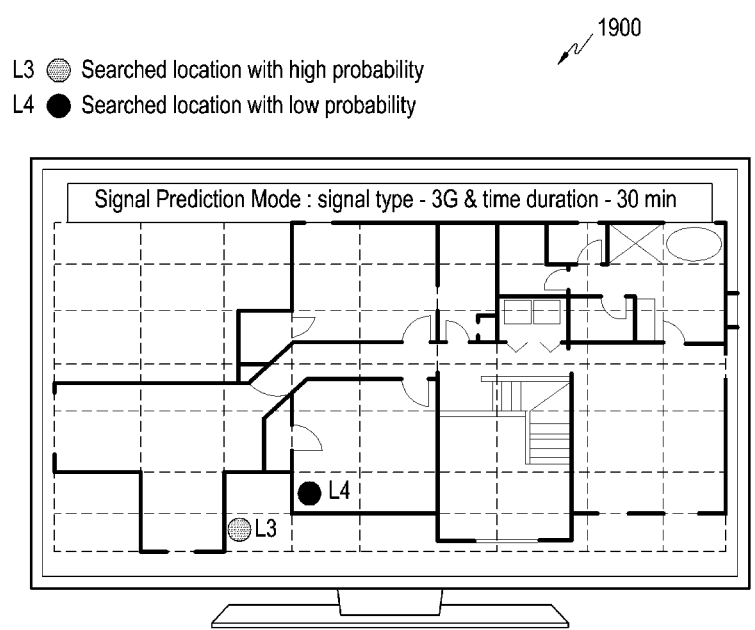
FIG. 19 illustrates a sample app UI for finding the lost device at home, according to an embodiment of the present disclosure.

FIG. 19 illustrates a sample app UI for finding the lost device at home, according to an embodiment of the present disclosure.

FIG. 19 illustrates a sample application UI 1900 for finding the lost device at the house. The application UI graphically displays locations having high and low probabilities L3 and L4, respectively, for the presence of the lost device. As shown, location L3 is the location having high probability for presence of the lost device, whereas the location L4 is the location having low probability for presence of the lost device. Accordingly, the user may search for the lost device first at the location L3.

Figure 20:
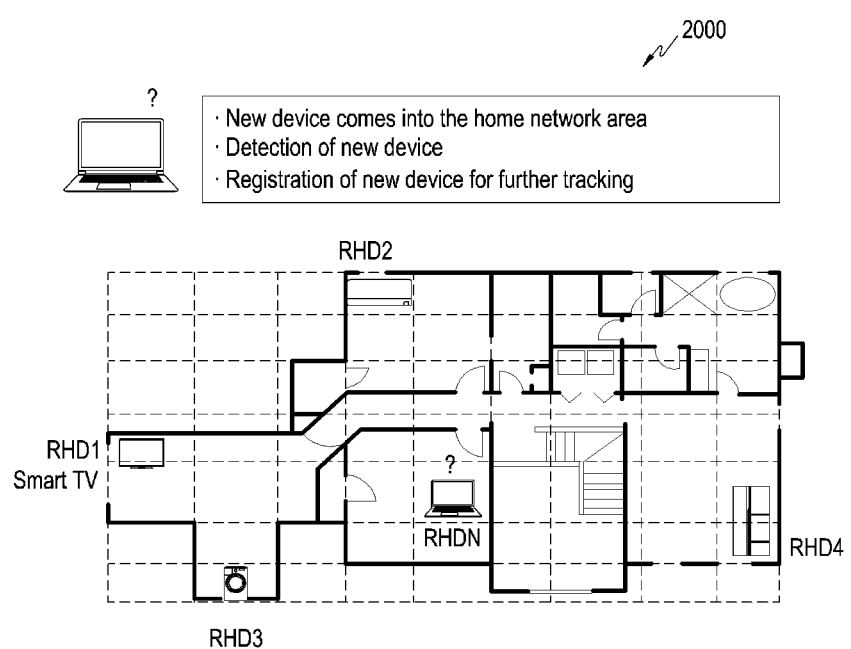
FIG. 20 illustrates a user scenario for a detection of new device in the home network, according to an embodiment of the present disclosure.

FIG. 20 illustrate a scenario 2000 for detection of new device in a home network according to an embodiment of the present disclosure. In this scenario 2000, the home network includes, for example, four devices RHD 1, RHD 2, RHD 3, and RHD 4. When a new device, such as a laptop as shown in the figure, comes into the home network, the same is detected as the new reference device and registered as a latest reference home device, RHD N.

Referring to FIG. 20, in one approach, detection and tracking of new devices by the master device can be accomplished by pattern matching of RSSI signal signatures sent by the new device with the learned signal signatures of the signal grid. Once the location of the new device is identified, the same can be registered in the home network as the new device first time and can be tracked by the master device based on application scenario. In another approach, the new device may know its own location either by requesting from the master device or by triangulation or range based localization techniques. However, the preferable approach is to ask the master device about its own location as it will not require any computation on the new device.

In one application, the disclosure could be used for inter-device notification among "Internet of things" (IOT) devices in a smart home. IOT is becoming a reality in present world. Sensors are being deployed in almost every corner of living atmosphere either indoor or outdoor. In a smart home scenario, sensors can sense the location of other devices and can send relevant information to target sensor device(s). In the era of IOT and smart homes, a user's profile can be shared among devices. User's common history and interest profile may be maintained by all the devices used by the user inside the smart home. It can be safely assumed that users generally carry their smart phone with them. Accordingly, if a smart TV is switched on and running some TV program, the smart TV can identify its intended viewers and their location in the smart home. If an intended viewer is not in front of the smart TV, but is inside the smart home in some different corner of the smart home, the smart TV can send a notification to the intended viewer's smart phone about his/her favorite program currently being played by the smart TV.

Figure 21:
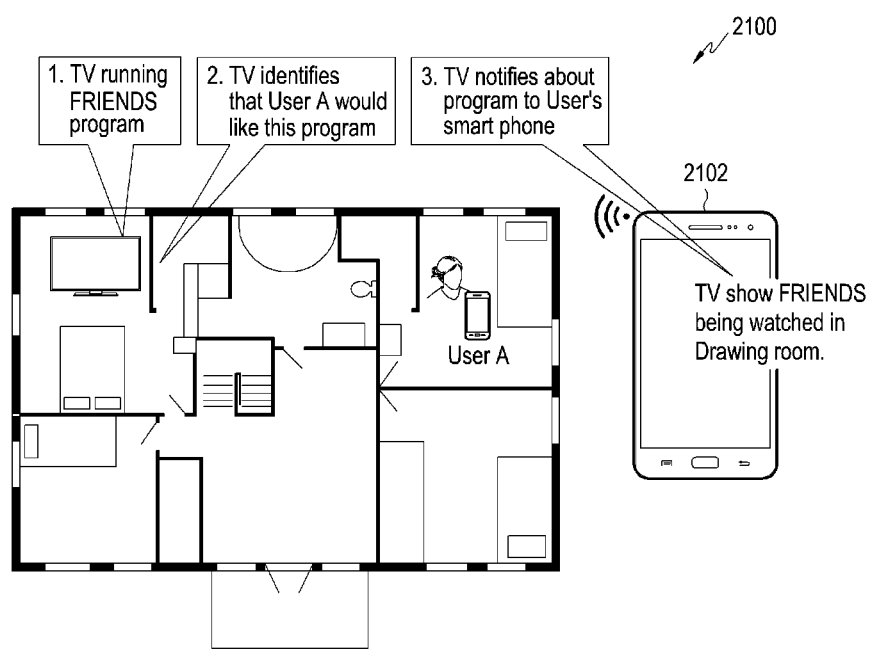
FIG. 21 illustrates a use case describing television (TV) program notification to user's smart phone, according to an embodiment of the present disclosure.

FIG. 21 illustrates such a use case 2100 describing TV notification to a user's smart phone according to an embodiment of the present disclosure. Referring to FIG. 21, in one example, a smart TV 2101 is running a program called 'FRIENDS' in one room in a house. A user A is another room in the same house. If the smart TV identifies that the user A would like this program, the smart TV notifies the user A on his/her smart phone 2102 about the program. Accordingly, the user A may choose to view the program.

In one application, the disclosure could be used for location and situation aware device configuration and settings. Generally, a device's behavior is expected to vary based on a user's location and contextual situation inside a smart home. Some situations, for example, eating while at the dining table, bathing in the washroom, watching TV while in the drawing room, doing study work while in the study room, etc. demand different behavior from a user's smart phone. Accordingly, a smart phone should be smart enough to understand its current location and change its settings accordingly without requiring user's intervention.

Figure 22:
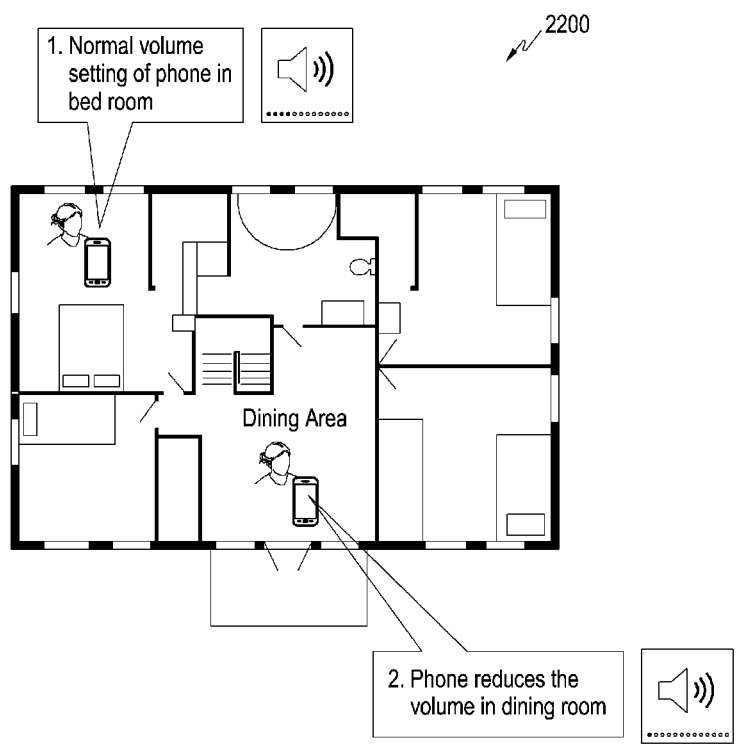
FIG. 22 illustrates a use case describing a location and situation aware device configuration, according to an embodiment of the present disclosure.

FIG. 22 illustrates such a use case 2200 describing location and situation aware device configuration according to an embodiment of the present disclosure. Referring to FIG. 22, when a user is in a bed room in a smart home for example, his/her smart phone identifies his/her location and keeps normal settings of volume and buzzer. When the user moves to a dining area and near a dining table, the smart phone can assume that the user would be having his meal. When the smart phone receives a call in this situation, it reduces its volume or puts the phone in buzzer mode to not disturb the user while having his meal. When the user moves to another part of house, the smart phone switches back to previous settings of volume and buzzer.

In one application, the disclosure could be used for inter-device collaboration. In IOT environments, various devices have different capabilities. A given task may require a specific capability which might not be available in an intended device. In such cases, the intended device can delegate the task to other more capable neighboring devices.

Figure 23:
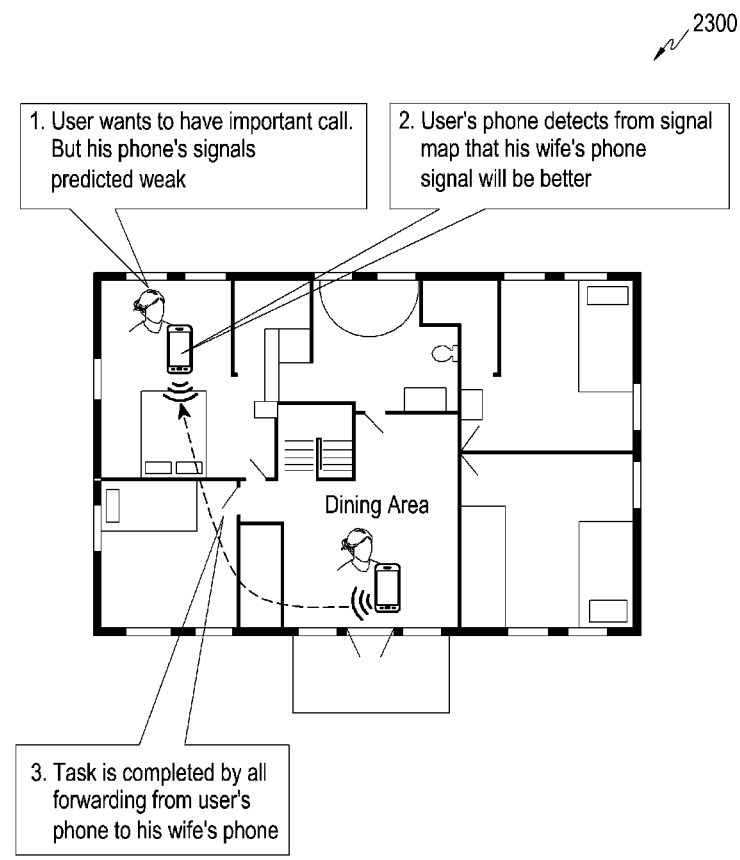
FIG. 23 illustrates a use case describing inter-device collaboration, according to an embodiment of the present disclosure.

FIG. 23 illustrates such a use case 2300 describing inter-device collaboration according to an embodiment of the present disclosure. Referring to the example of FIG. 23, a user wants to make an urgent video conference from his smart phone. As per the signal map, the signal of his phone's service provider is predicted as being weak for the next one hour. However, single strength of his wife's phone's service provider is predicted as being strong for the next one hour. In this scenario, the user's phone will recommend the user to direct calls to his wife's phone. If the user agrees, the user's smart phone will connect to his wife's phone and perform the task using call forwarding or the like.

Figure 24:
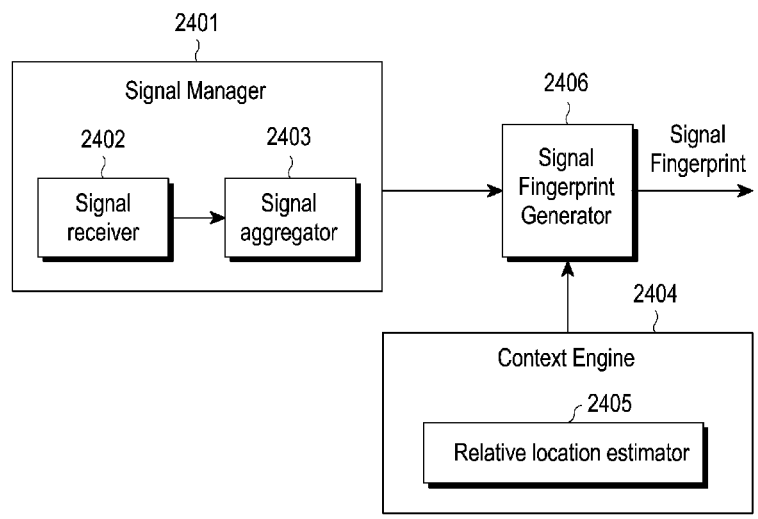
FIG. 24 illustrates a block diagram for a signal profile generation, according to an embodiment of the present disclosure.

FIG. 24 illustrates a block diagram for signal profile generation according to an embodiment of the present disclosure. Referring to FIG. 24, a signal manager 2401 manages incoming signals from various reference devices and aggregates the signal information corresponding to particular time T and location (X, Y). The signal manager 2401 comprises a signal receiver 2402 for receiving incoming signals. The signal manager 2401 further comprises a signal aggregator 2403 for aggregating the signal information. A context engine 2404 fetches the context information, such as time and location. Here, the time information can be extracted from the device itself. A relative location estimator 2405 estimates the relative location of the device which is receiving the signals from other home devices based on signal strength received at the device and relative location of fixed devices in the home network. A signal fingerprint generator 2406 encodes the received signal information and contextual information and generates unique fingerprint information to be sent for learning purposes.

Figure 25:
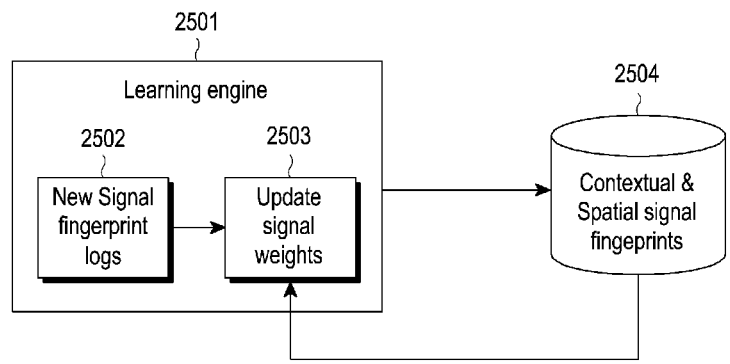
FIG. 25 illustrates a block diagram for a learning engine, according to an embodiment of the present disclosure.

FIG. 25 illustrates a block diagram for a learning engine 2501 and its use according to an embodiment of the present disclosure. Referring to FIG. 25, the learning engine 2501 collects the new data and updates the learned model for the signal map. The learning engine 2501 receives new signal fingerprint logs 2502 and updates a model of signal weights 2503 retrieved from a database 2504. This updated model is stored in the database 2504 of signal fingerprints.

Figure 26:
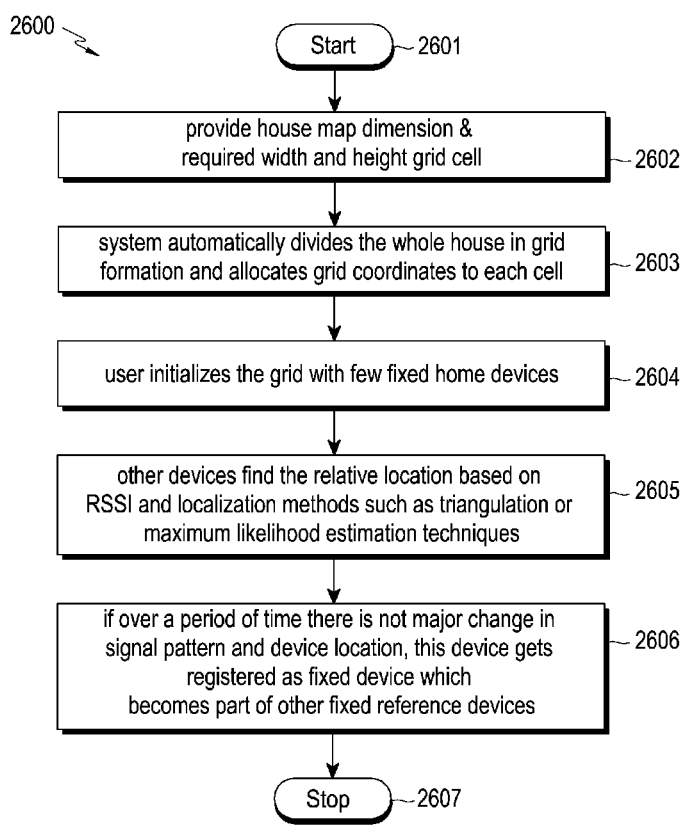
FIG. 26 is a flowchart of a method for system initialization, according to an embodiment of the present disclosure.

FIG. 26 illustrates a method 2600 for system initialization according to an embodiment of the present disclosure. At operation 2601, the method 2600 for system initialization begins. At operation 2602, house map dimensions, and required width and height of grid cells is provided as input. At operation 2603, a master device automatically divides the whole house in a grid and cell formation, and allocates grid coordinates to each cell. At operation 2604, a user initializes the grid with, for example, three fixed home devices. At operation 2605, other devices find their relative location based on RSSI and localization methods, such as triangulation or maximum likelihood estimation techniques. At operation 2606, if over a period of time there is no major change in signal patterns and device locations, these other devices get registered as fixed devices like initial fixed home devices. At operation 2607, the system initialization ends.

Figure 27:
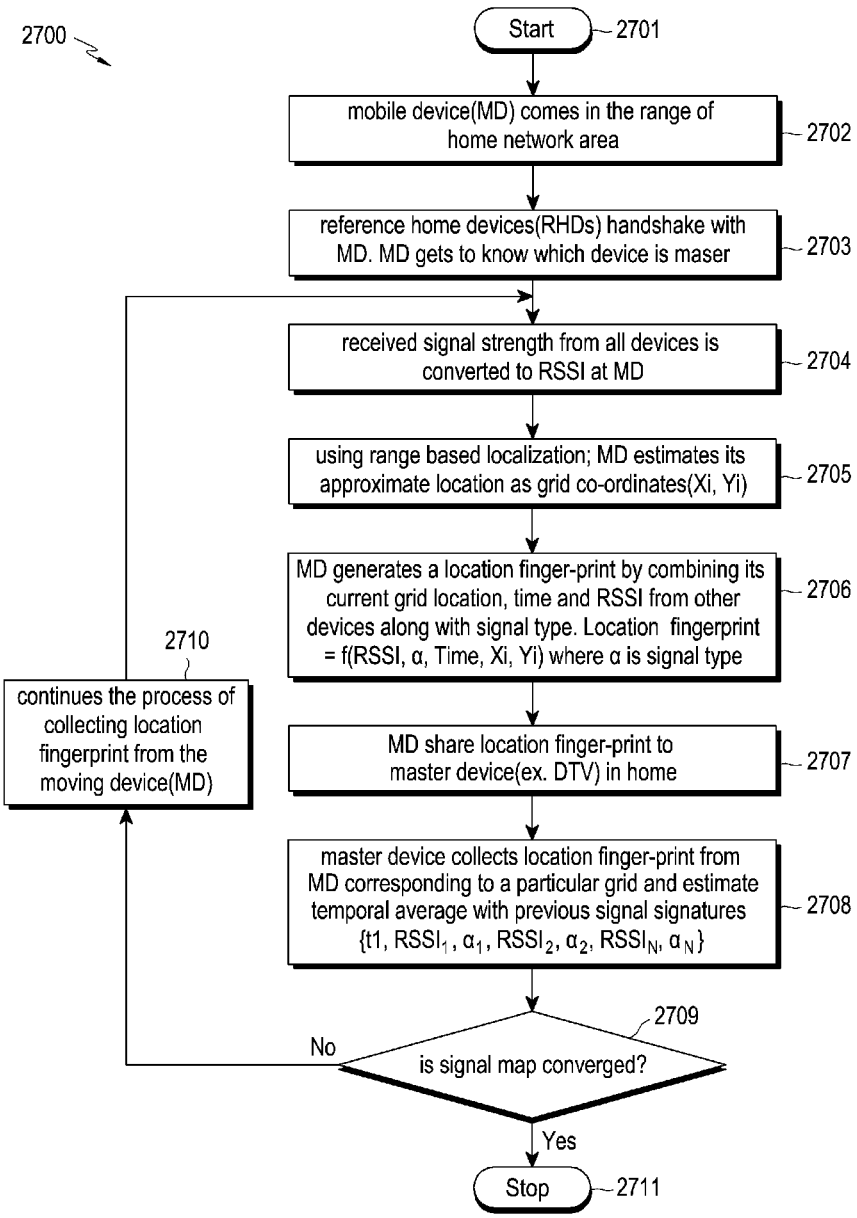
FIG. 27 is a flowchart of a method for a learning process, according to an embodiment of the present disclosure.

FIG. 27 illustrates a method 2700 for a learning process according to an embodiment of the present disclosure. At operation 2701, the method 2700 for the learning process begins. At operation 2702, an MD comes in the range of a home network area. At operation 2703, RHDs handshake with the MD. The MD gets to know which reference home device is a master device. At operation 2704, RSS from devices is converted to RSSI at the MD. At operation 2705, the MD estimates its approximate location as grid coordinates (Xi, Yi) using range based localization. At operation 2706, the MD generates a location fingerprint by combining its current grid location, time, and RSSI from other devices along with a signal type as indicated below.

The location fingerprint can be represented by Equation (7) as follows:

Location fingerprint=$f$(RSSI,$\alpha$,Time,$Xi$,$Yi$) where $\alpha$ is signal type  (7)

At operation 2707, the MD shares location fingerprint with the master device, for example, a DTV in the home. At operation 2708, the master device collects location fingerprint from the MD corresponding to a particular grid and estimates temporal average with previous signal signatures $\{t_1, RSSI_1, \alpha_1, RSSI_2, \alpha_2, RSSI_N, \alpha_N\}$ of the same grid. At operation 2709, it is checked whether a signal map has converged. At operation 2710, the process of collecting location fingerprint from the MD is continued if the signal map has not converged. Otherwise, at operation 2711, the learning process ends.

Figure 28:
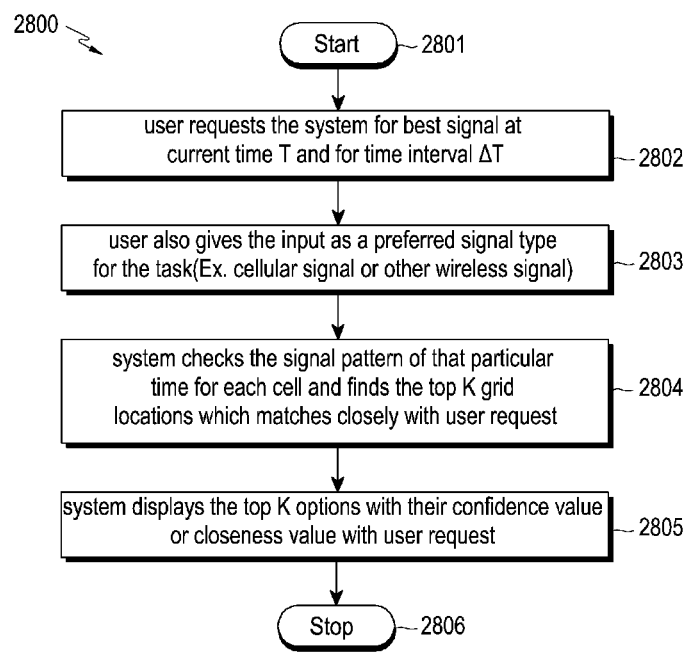
FIG. 28 is a flowchart of a method for best signal prediction, according to an embodiment of the present disclosure.

FIG. 28 illustrates a method 2800 for a best signal prediction according to an embodiment of the present disclosure. Referring to FIG. 28, at operation 2801, the method 2800 for a best signal prediction begins. At operation 2802, a user requests the system for best signal at current time T and for time interval ΔT. At operation 2803, the user also gives the input about a preferred signal type, such as cellular signal or other wireless signal, for the task. At operation 2804, the system checks the signal pattern of that particular time for each cell and finds the top K (i.e., top 3, top 5, top 10, etc.) grid locations which matches the user request. At operation 2805, the system displays the top K options with their confidence value or closeness value with the user request. At operation 2806, the best signal prediction ends.

Figure 29:
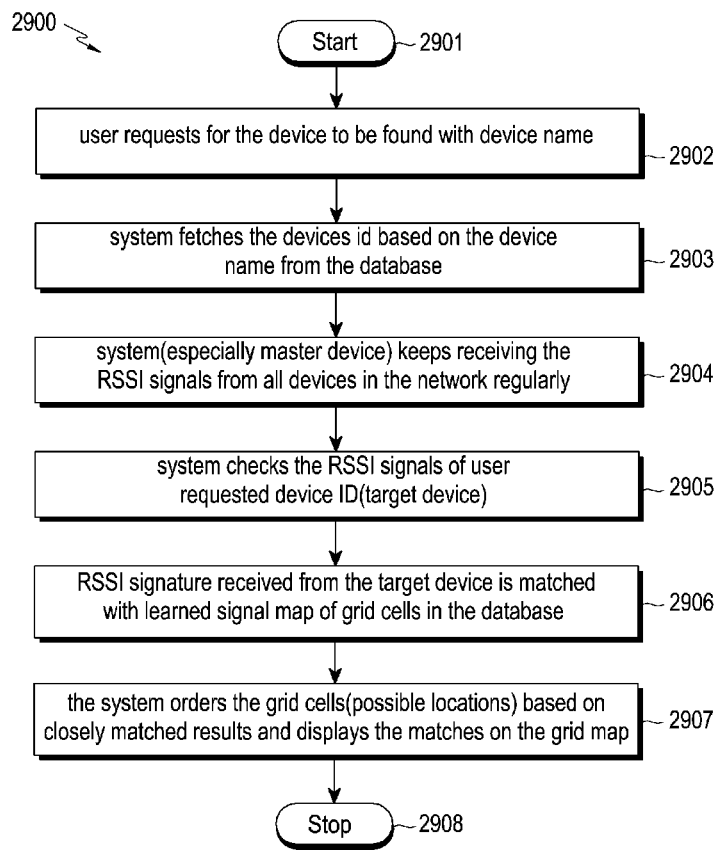
FIG. 29 is a flowchart of a method for lost device detection, according to an embodiment of the present disclosure.

FIG. 29 illustrates a method 2900 for lost device detection according to an embodiment of the present disclosure. At operation 2901, the method 2900 for lost device detection begins. At operation 2902, a user requests for the device to be found by identifying at least a device name. At operation 2903, the system fetches the device's id based on the device name from the database. At operation 2904, the system, especially the master device, keeps receiving the RSSI signals from all devices in the network regularly. At operation 2905, the system checks the RSSI signals of the user requested device ID, i.e., target device. At 2906, an RSSI signature received from the target device is matched with the learned signal map of grid cells in the database. At operation 2907, the system orders the grid cells, i.e., possible locations based on closely matched results and displays the matches on the grid map to indicate a location of the lost device. At operation 2908, the lost device detection ends.

The signal strength map generated according to the disclosure can be utilized in various ways, such as predicting the location of best signal quality for a particular time period, thus helping a user in performing important tasks, such as video conferences, phone conversations, or the like. Further, the disclosure provides convergence of various home network communication protocols, such as wireless, Zigbee, BT, GSM/code division multiple access (CDMA), broadband, NFC, etc. in a home network environment to enhance the accuracy of a signal fingerprint. Further, the disclosure provides collaboration of a variety of devices in a home network environment for generating a signal fingerprint based on RSS and contextual information, such as time and relative location. Further, the disclosure provides learning of contextual signal profiles for all possible areas in a home network environment and prediction of best signal quality of a given signal type at any given time T or for a given time duration ΔT.

The disclosure provides an intelligent signal map in a home network environment by convergence of varied signal types of home devices. The advantages of the disclosure include, but are not limited to convergence of home network devices for the purpose of signal map learning, which leads to numerous useful applications related to signal quality, and convergence of various signals, which leads to accuracy of learning model and better predictions. Implementing this disclosure in a home network makes smart homes even smarter. The disclosure provides multiple options for localization which can be used to achieve similar results. Examples of such localization techniques include, but are not limited to triangulation, tri-lateration, maximum likelihood techniques, and weighted centroid localization, etc. In one alternative implementation, for estimating relative location of an MD from fixed reference devices, weighted centroid localization can also be used to locate the MD with respect to the reference devices. In one alternative implementation, for pattern matching, various distance estimation techniques such as Euclidean distance can be used. In one alternative implementation, angulation and trilateration approaches can be used for relative position finding.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting control information by a master device, the method comprising:

receiving, from at least one transmitting device among a plurality of transmitting devices, registration information comprising a location of the at least one transmitting device, a type of signal which is transmitted by the at least one transmitting device, and a device identifier (ID) of the at least one transmitting device, wherein the registration information is generated by the at least one transmitting device;

receiving, from at least one receiving device, control parameters comprising a location of the at least one receiving device, a strength of a first signal received by the at least one receiving device at a first location from the at least one transmitting device, a type of the first signal, a strength of a second signal received by the at least one receiving device at the first location from the at least one transmitting device, a type of the second signal, and request parameters that the at least one transmitting device is required to satisfy;

generating control information based on the control parameters and the received registration information; and providing a determination of a transmitting device among the plurality of transmitting devices based on the request parameters and the control information.

2. The method as claimed in claim 1, wherein the control parameters further comprises a device ID of the at least one transmitting device from which the signal is received.

3. The method as claimed in claim 1, wherein the control parameters further comprise information about a time of receipt of the first signal and the second signal.

4. The method as claimed in claim 1, wherein the control parameters further comprise a strength of a further signal received by the at least one receiving device at the first location and a type of the further signal.

5. The method as claimed in claim 1, wherein the registration information further comprises time information about a time of receipt of the signal from the at least one transmitting device.

6. The method as claimed in claim 1, further comprising:
determining a variation in strength of at least one of the first signal and the second signal received by the at least one receiving device at the first location over a period of time.

7. The method as claimed in claim 1, further comprising:
determining a variation in strength of at least one of the first signal and the second signal received by the at least one receiving device at different locations.

8. The method as claimed in claim 1, wherein the at least one receiving device comprises one or more moving devices and/or the at least one transmitting device.

9. The method as claimed in claim 1, further comprising displaying a signal strength map, wherein the control information includes the signal strength map of the first signal and the second signal at the first location.

10. The method as claimed in claim 9, wherein the providing of the determination comprises:
analyzing the signal strength map; and
providing a signal type for use at a particular location of the analyzed signal strength map.

11. The method as claimed in claim 9, further comprising:
analyzing the signal strength map and determining the location of the at least one receiving device; and
controlling an electronic device based on the location of the at least one receiving device.

12. The method as claimed in claim 9, wherein the providing of the determination comprises:
analyzing the signal strength map; and
providing a location for accessing a particular type of signal.

13. A master device for transmitting control information, the master device comprising:
a receiver configured to:
receive, from at least one transmitting device among a plurality of transmitting devices, registration information comprising a type of signal which is transmitted by the at least one transmitting device, and a device identifier (ID) of the at least one transmitting device, wherein the registration information is generated by the at least one transmitting device, and
receive, from at least one receiving device, control parameters including a location of the at least one receiving device, a strength of a first signal received by the at least one receiving device at a first location from the at least one transmitting device, a type of the first signal, a strength of a second signal received by the at least one receiving device at the first location, from the at least one transmitting device, a type of the second signal, and request parameters that the at least one transmitting device is required to satisfy; and
a processor configured to:
generate control information based on the control parameters and the received registration information, and
provide a determination of a transmitting device among the plurality of transmitting devices based on the request parameters and the control information.

14. A method for receiving control information by a receiving device, the method comprising:
receiving, from at least one transmitting device among a plurality of transmitting devices, signals comprising information about a type of signal which is transmitted by the at least one transmitting device, and a device identifier (ID) of the at least one transmitting device;
transmitting, to a master device, control parameters comprising a location of the receiving device, a strength of a first signal received by the receiving device at a first location from the at least one transmitting device, a type of the first signal, a strength of a second signal received by the receiving device at the first location from the at least one transmitting device, a type of the second signal, and request parameters that the at least one transmitting device is required to satisfy; and
receiving, from the master device, information of a transmitting device among the plurality of transmitting devices determined based on control information which is generated based on the control parameters and registration information by the master device and the request parameters, the registration information comprising a location, a type of signal which is transmitted by the transmitting device, and a device identifier (ID) of the transmitting device.

15. The method as claimed in claim 14, wherein the control parameters further comprise a device ID of the at least one transmitting device from which the receiving device receives the signal.

16. The method as claimed in claim 14, wherein the control parameters further comprise information about a time of receipt of the first signal and the second signal.

17. The method as claimed in claim 14, wherein the control parameters further comprise a strength of a further signal received by the receiving device at the first location and a type of the further signal.

18. The method as claimed in claim 14, further comprising:
determining, by the receiving device, a current location of the receiving device based on the strength of the received signals; and
controlling at least one operation of the receiving device based on the location of the receiving device.

19. The method as claimed in claim 14,
further comprising displaying a signal strength map,
wherein the control information includes the signal strength map of the first signal and the second signal at the first location.

20. The method as claimed in claim 19, wherein the control information comprises at least one of a signal type for use at a particular location of the signal strength map and a location for accessing a particular type of signal.

21. A receiving device for receiving control information, the receiving device comprising:
a receiver configured to receive, from at least one transmitting device among a plurality of transmitting devices, a signal including information about a type of signal which is transmitted by the at least one transmitting device, and a device identifier (ID) of the at least one transmitting device;
a processor configured to generate control parameters including a location of the receiving device, a strength of a first signal received by the receiving device at a first location from the at least one transmitting device, a type of the first signal, a strength of a second signal received by the receiving device at the first location from the at least one transmitting device, a type of the second signal, and request parameters that the at least one transmitting device is required to satisfy; and a transmitter configured to transmit the control parameters, wherein the receiver is further configured to receive, from a master device, information of a transmitting device among the plurality of transmitting devices determined based on control information which is generated based on the control parameters and registration information by the master device and the request parameters, the registration information comprising a location, a type of signal which is transmitted by the transmitting device, and a device identifier (ID) of the transmitting device.

* * * * *